US012566399B2

(12) United States Patent
Yamaguchi

(10) Patent No.: US 12,566,399 B2
(45) Date of Patent: Mar. 3, 2026

(54) BELT DRIVING MECHANISM AND IMAGE FORMING APPARATUS

(71) Applicant: KYOCERA Document Solutions Inc., Osaka (JP)

(72) Inventor: Akihiro Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/673,241

(22) Filed: May 23, 2024

(65) Prior Publication Data

US 2024/0393727 A1 Nov. 28, 2024

(30) Foreign Application Priority Data

May 26, 2023 (JP) ................................ 2023-086777

(51) Int. Cl.
*G03G 15/00* (2006.01)

(52) U.S. Cl.
CPC ................................ *G03G 15/757* (2013.01)

(58) Field of Classification Search
CPC ............ F16H 2057/0221; F16H 9/125; F16H 2061/66295
See application file for complete search history.

(56) References Cited

U.S. PATENT DOCUMENTS 3,149,356 A * 9/1964 Murray .............. G03G 21/0041 15/100
5,450,175 A * 9/1995 Sato .................... G03G 15/041 359/822
2013/0065725 A1* 3/2013 Matsuda ............ F16H 57/0426 475/159
2015/0369338 A1* 12/2015 Sugita ................ F16H 57/0464 399/167
2019/0243303 A1* 8/2019 Nieda ................. G03G 15/757
2020/0116248 A1 4/2020 Yamaguchi
2020/0371462 A1* 11/2020 Kido ................... G03G 15/221
2023/0350338 A1* 11/2023 Wang .................. G03G 21/181

FOREIGN PATENT DOCUMENTS

JP 2020064111 A 4/2020

* cited by examiner

*Primary Examiner* — Sevan A Aydin
(74) *Attorney, Agent, or Firm* — Studebaker Brackett PLLC

(57) ABSTRACT

A belt driving mechanism rotates a rotating body provided in a rotating device around a transmission shaft, and includes a driving device provided adjacent to the rotating device and a bearing structure supporting the transmission shaft extending from the rotating device to the driving device through the support frame. The driving device includes a housing, a fixed frame, a driving pulley, a driven pulley, a belt and a circumference correction part. The housing is fixed to the support frame. The fixed frame is fixed in the housing. The driven pulley is fixed to the transmission shaft. The belt is wound around the driving pulley and the driven pulley. The bearing structure includes a first bearing part provided in the fixed frame and the second bearing part provided in the housing on an opposite side to the first bearing part with respect to the driven pulley.

4 Claims, 7 Drawing Sheets

BELT DRIVING MECHANISM AND IMAGE FORMING APPARATUS

INCORPORATION BY REFERENCE

This application is based on and claims the benefit of priority from Japanese patent application No. 2023-086777 filed on May 26, 2023, which is incorporated by reference in its entirety.

BACKGROUND

The present disclosure relates to a belt driving mechanism which transmits a rotation to a rotating body via a transmission shaft and an image forming apparatus.

A driving transmission device which transmits a rotation of a driving pully to a driven pully via an endless belt wound around the driving pulley and the driven pulley is known. In order to transmit the rotation suitably, the belt is applied with a predetermined tension.

In the driving transmission device using the belt, if the position, angle and posture of the driving pulley and the driven pulley (hereinafter, called as "alignment") is slightly shifted, meandering of the belt and inclination of the rotating shaft (misalignment) occur, and driving proper transmission becomes impossible. In the above-described driving transmission device, there is a problem that the driven pulley slightly moves in the direction closer to the driving pulley due to the tension applied to the belt, and the alignment is broken (the misalignment occurs).

SUMMARY

The belt driving mechanism according to the present disclosure rotates a rotating body provided in a rotating device, around a transmission shaft. The belt driving mechanism includes a driving device and a bearing structure. The driving device is provided adjacent to an outer surface of a support frame of the rotating device. The bearing structure supports the transmission shaft extending from the rotating device to the driving device through the support frame. The driving device includes a housing, a fixed frame, a driving pulley, a driven pulley, a belt and circumference correction part. The housing is fixed on the outer surface of the support frame. The fixed frame is fixed in an inside of the housing. The driving pulley rotates by a drive source. The driven pulley is fixed to the transmission shaft in alignment with the transmission shaft. The belt is wound around the driving pulley and the driven pulley. The circumference correction part applies tension to the belt. The bearing structure includes a first bearing part and a second bearing part. The first bearing part is provided in the fixed frame. The second bearing part is provided in the housing on an opposite side to the first bearing part with respect to the driven pulley.

An image forming apparatus according to the present disclosure includes the belt driving mechanism and a drum device which is the rotating device including a photosensitive drum as the rotating body.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
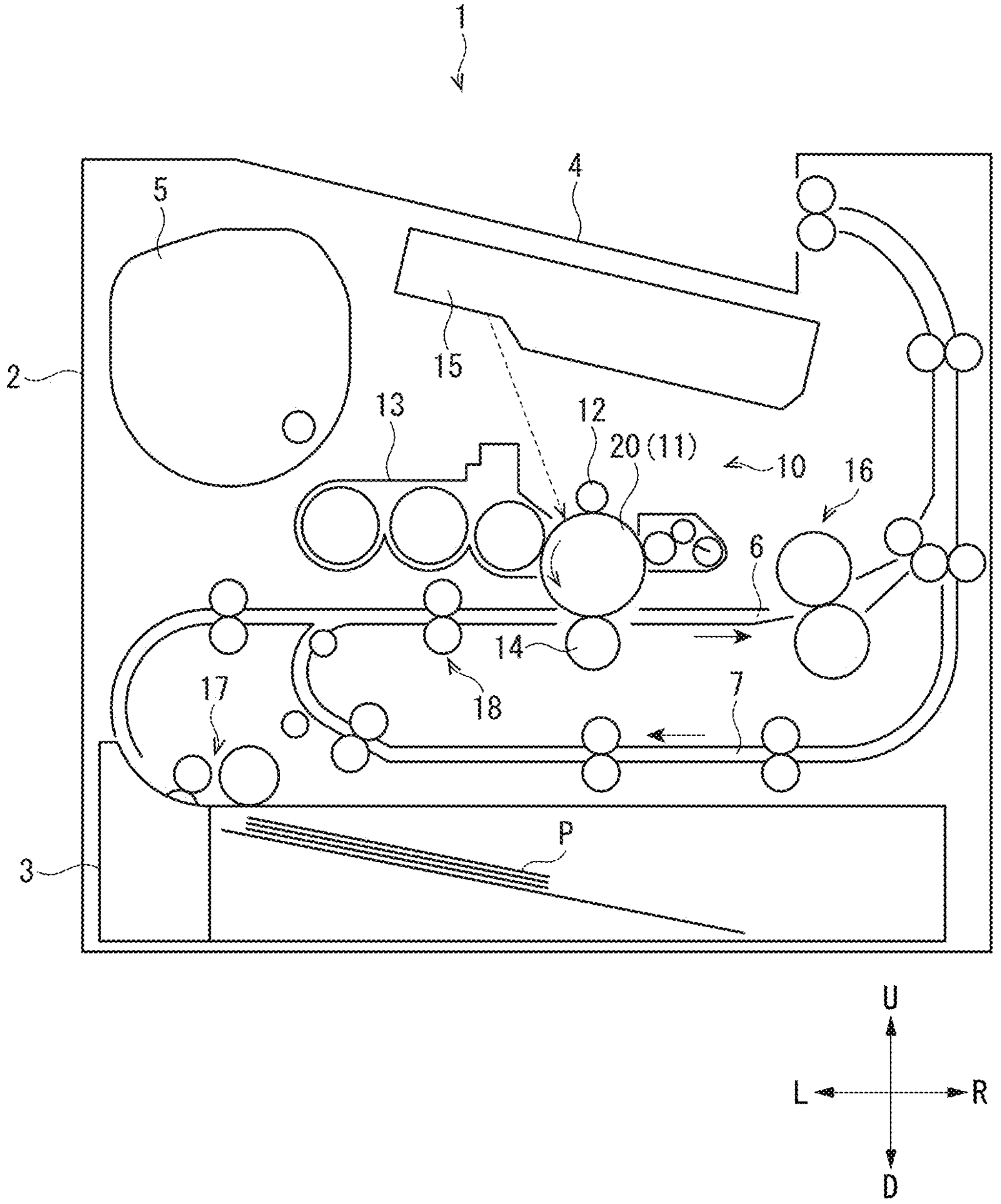
FIG. 1 is a schematic view (a front view) showing an inner structure of an image forming apparatus according to one embodiment of the present disclosure.

Hereinafter, with reference to the attached drawings, an embodiment of the present disclosure will be described. Fr, Rr, L, R, U, and D shown in the drawings indicate the front, rear, left, right, upper, and lower side. Although directional and positional terms are used herein, they are used for convenience of description and do not limit the technical scope of the present disclosure.

Figure 2:
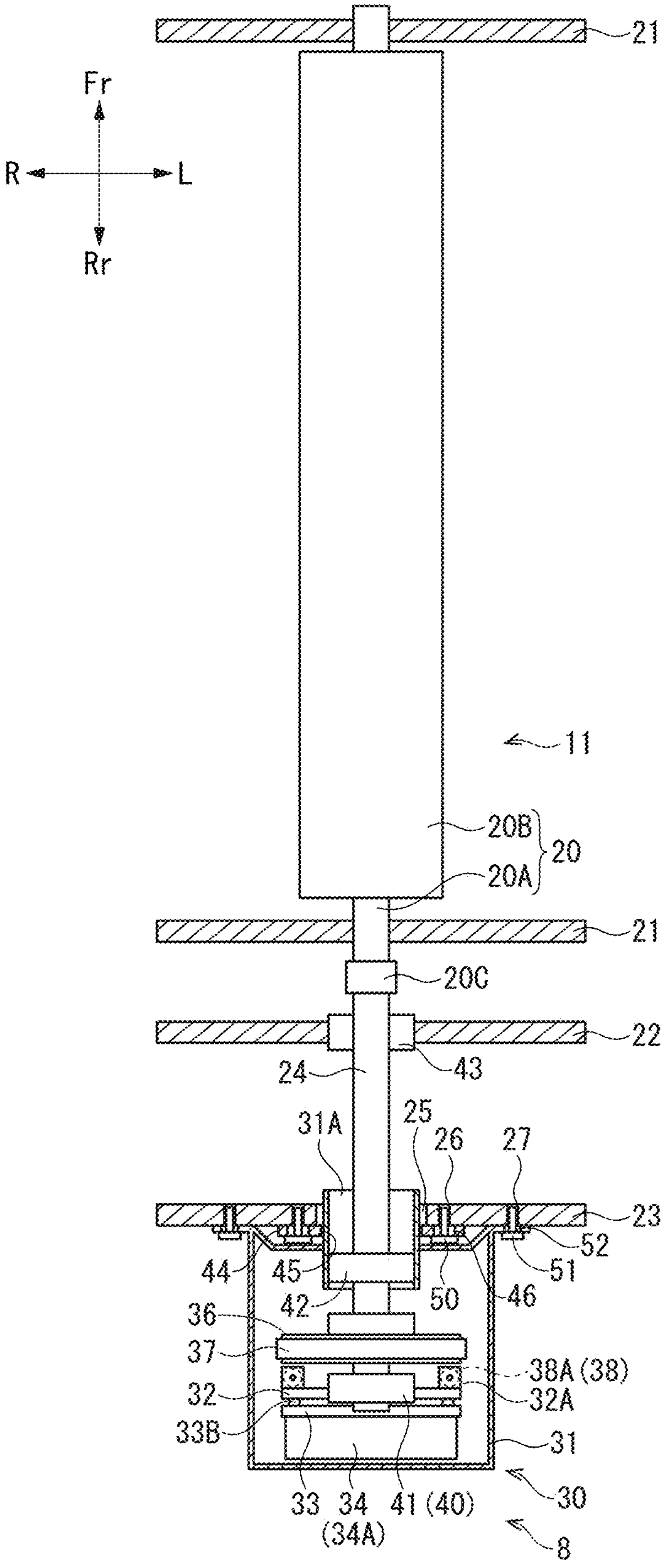
FIG. 2 is a plan view showing a drum device and a belt driving mechanism according to the embodiment of the present disclosure.

[Image forming apparatus] With reference to FIG. 1 and FIG. 2, the image forming apparatus 1 will be described. FIG. 1 is a schematic view (a front view) showing the internal structure of the image forming apparatus 1. FIG. 2 is a plan view showing a drum device 11 and a belt driving mechanism 8.

As shown in FIG. 1, the image forming apparatus 1 includes an apparatus main body 2 constituting a substantially rectangular parallelepiped appearance. In the lower portion of the apparatus main body 2, a sheet feeding cassette 3 in which a sheet P (medium) is stored is detachably provided, and on the upper surface of the apparatus main body 2, a sheet discharge tray 4 is provided. In the left upper portion of the apparatus main body 2, a toner container 5 storing, for example, black toner (developer) is provided.

The image forming apparatus 1 is provided with an image forming part 10 which forms an image on the sheet P by an electrophotographic method. The image forming part 10 includes a drum device 11, a charging device 12, a developing device 13, a transfer roller 14, an optical scanning device 15, and a fixing device 16.

The drum device 11 as an example of the rotating device is provided in the middle stream portion of a first conveyance path 6 extending from the sheet feeding cassette 3 to the sheet discharge tray 4. As shown in FIG. 2, the drum device 11 includes a photosensitive drum 20, a pair of first support frames 21, a second support frame 22, and a third support frame 23.

The photosensitive drum 20 as an example of the rotating body is formed by laminating a photosensitive layer 20B on the surface of a blank tube 20A made of metal, and formed in a cylindrical shape. The pair of first support frame 21, the second support frame 22 and the third support frame 23 are each made of sheet metal. The first support frames 21 are arranged apart from each other in the front-and-rear direction on both sides of the photosensitive drum 20, and rotatably support the photosensitive drum 20 (a rotating shaft portion of the blank tube 20A). The second support frame 22 is arranged rearward away from the rear first support frame 21. The third support frame 23 (the support frame) is arranged rearward away from the second support frame 22. The rear end of the rotating shaft portion of the photosensitive drum 20 is located between the rear first support frame 21 and the second support frame 22, and is connected to a transmission shaft 24 via a coupling 20C. The transmission shaft 24 extends rearward from the coupling 20C, and penetrates the second support frame 22 and the third support frame 23. The rear portion of the transmission shaft 24 protrudes rearward from the third support frame 23.

As shown in FIG. 1, the charging device 12, the developing device 13, and the transfer roller 14 are arranged around the photosensitive drum 20 in the order of the image forming process. The transfer roller 14 comes into contact with the photosensitive drum 20 from the lower side to form a transfer nip. The optical scanning device 15 is provided above the photosensitive drum 20. The fixing device 16 is provided on the downstream side portion of the first conveyance path.

A sheet feeding part 17 is provided at the upstream end of the first conveyance path 6, and a registration rollers pair 18 is provided at the midstream portion (on the upstream side of the photosensitive drum 20) of the first conveyance path 6. Inside the apparatus main body 2, a second conveyance path 7 is provided which branches at the downstream portion of the first conveyance path 6 and merges with the upstream portion of the first conveyance path 6. On the first conveyance path 6 and the second conveyance path 7, a plurality of conveying roller pairs for conveying the sheet P is provided.

The image forming apparatus 1 is provided with a control device (not shown) for appropriately controlling various devices to be controlled. The control device includes a processor or the like that executes various kinds of arithmetic processing according to programs and parameters stored in memory. The image forming apparatus 1 is provided with a display input unit (not shown) such as a touch panel or a button for inputting instructions a user various from (operator). The display input unit is electrically connected to the control device and transmits an input signal to the control device or receives an electric signal (for example, display information on the touch panel) from the control device.

[Image Forming Process] The operation of the image forming apparatus 1 will be described. For example, the control device performs the image forming process on the basis of image data input from an external terminal as follows.

The charging device 12 charges the surface of the photosensitive drum 20, and the optical scanning device 15 emits scanning light based on the image data to form an electrostatic latent image on the surface of the photosensitive drum 20. The developing device 13 develops the electrostatic latent image on the surface of the photosensitive drum 20 into a toner image using the toner supplied from the toner container 5. The sheet feeding part 17 feeds the sheet P from the sheet feeding cassette 3 to the first conveyance path 6 one by one. The sheet P is conveyed along the first conveyance path 6, the skew of the sheet P is corrected by the registration rollers pair 18, and then the sheet P enters the transfer nip. The transfer roller 14 transfers the toner image on the photosensitive drum 20 to the sheet P passing through the transfer nip, and the fixing device 16 thermally fixes the toner image to the sheet P. In the case of single-side printing, the sheet P is discharged to the sheet discharge tray 4.

In the case of both-side printing, the sheet P is switched back at the downstream end of the first conveyance path 6, conveyed through the second conveyance path 7, and returned to the first conveyance path 6 again. Thereafter, an image is formed on the back surface of the sheet P through the same process as described above, and the both-side printed sheet P is discharged to the sheet discharge tray 4.

Figure 3:
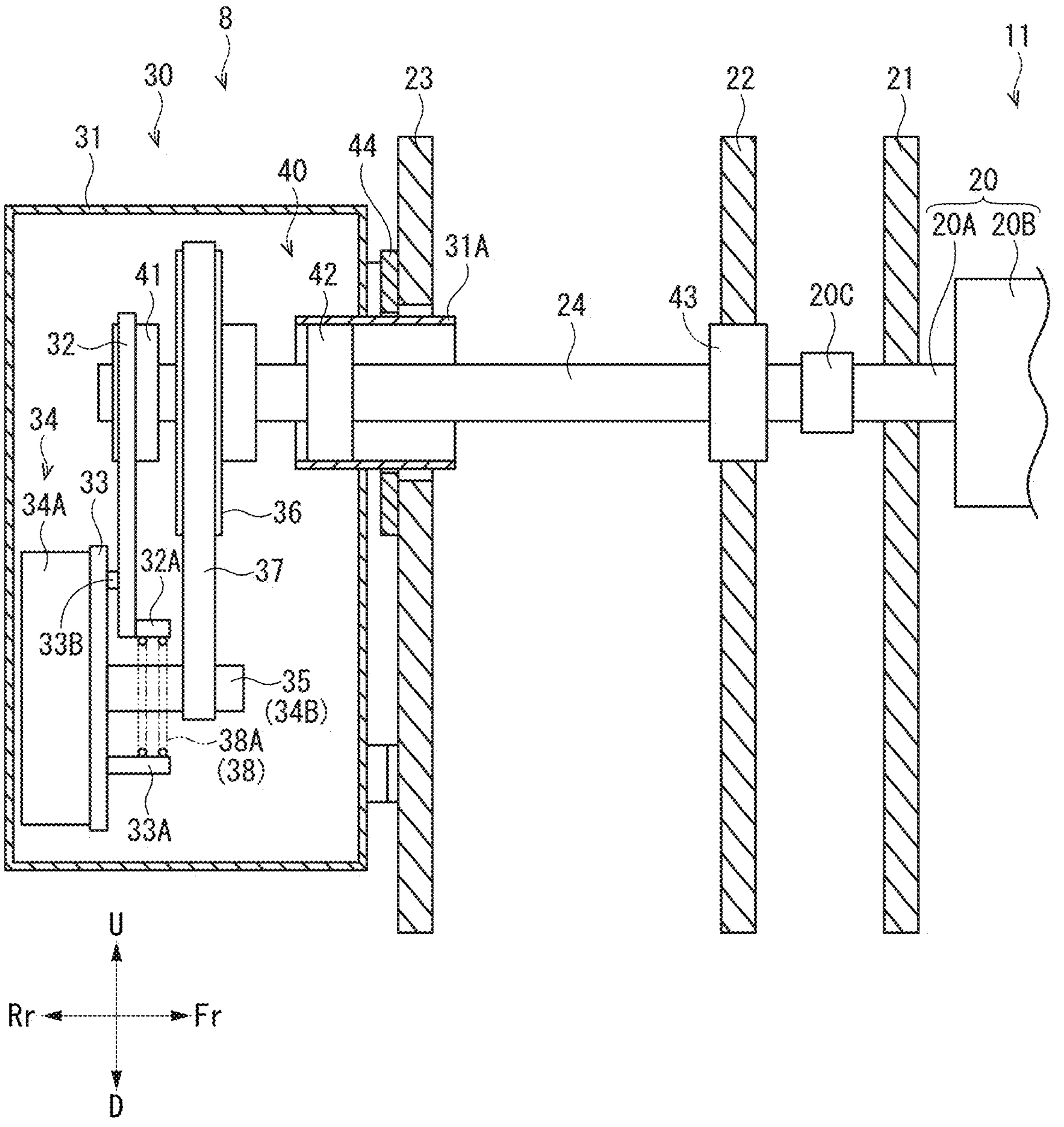
FIG. 3 is a side view showing the belt driving mechanism according to the embodiment of the present disclosure.
Figure 4:
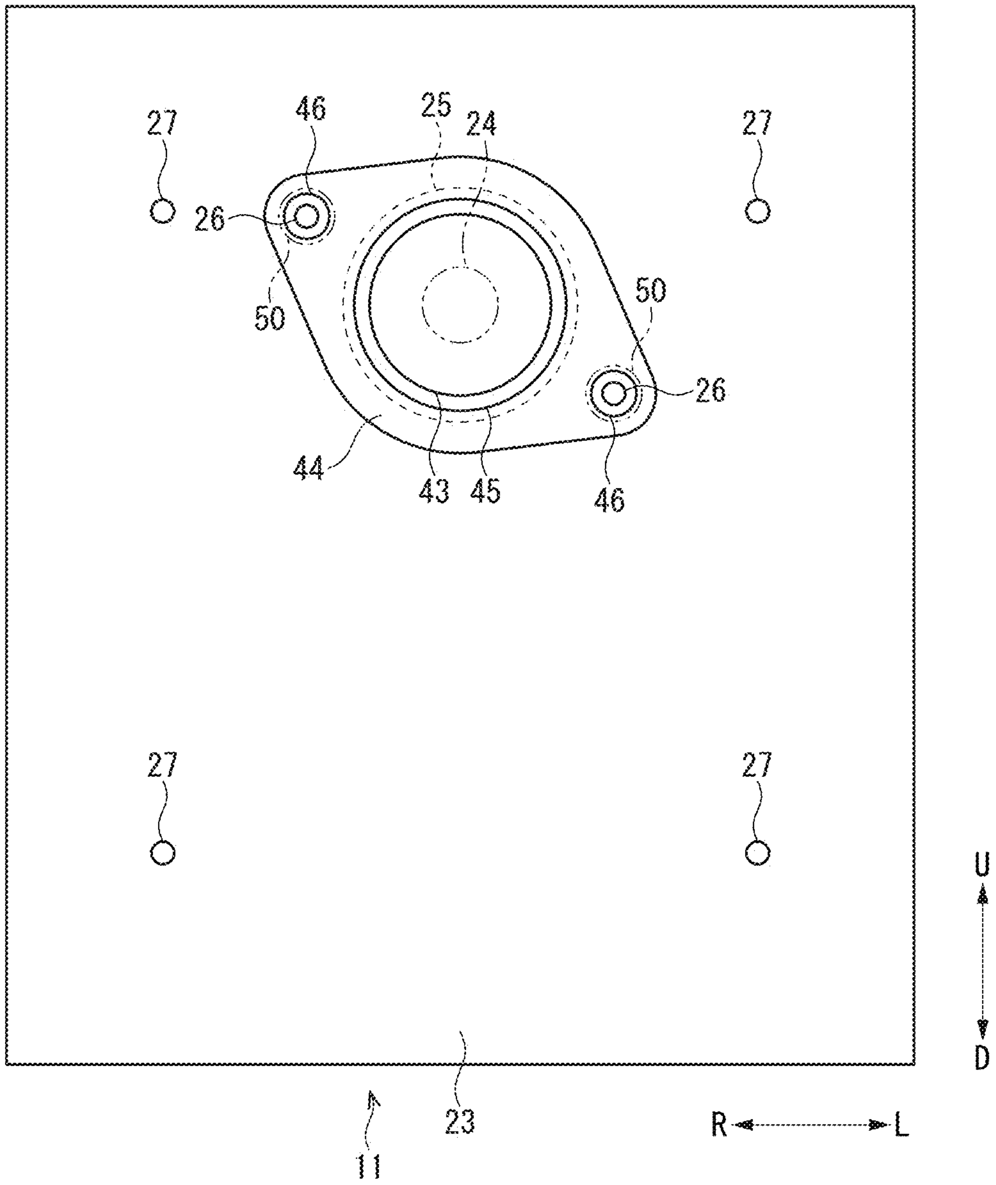
FIG. 4 is a rear view showing an adjustment member and the others of the belt driving mechanism according to the embodiment of the present disclosure.
Figure 5:
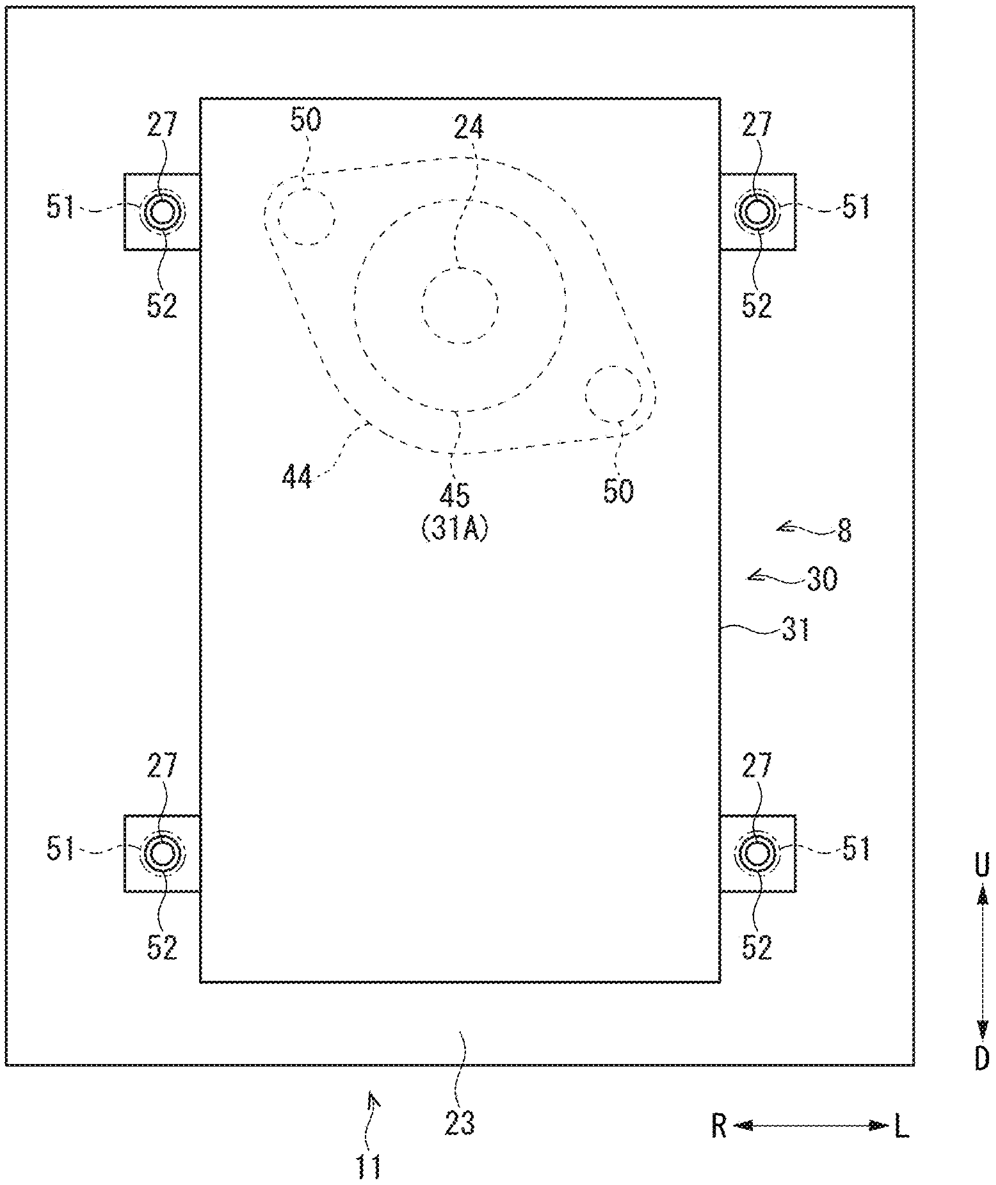
FIG. 5 is a rear view showing the belt driving mechanism according to the embodiment of the present disclosure.

[Belt Driving Mechanism] As shown in FIG. 2, the image forming apparatus 1 is provided with a belt driving mechanism 8 which rotates the photosensitive drum 20 provided in the drum device 11 around the transmission shaft 24. Hereinafter, the belt driving mechanism 8 will be described with reference to FIG. 2 to FIG. 5. FIG. 3 is a side view showing the belt driving mechanism 8. FIG. 4 is a rear view showing an adjustment member 44 and the others of the belt driving mechanism 8. FIG. 5 is a rear view showing the belt driving mechanism 8.

As shown in FIG. 2 and FIG. 3, the belt driving mechanism 8 includes a driving device 30 and a bearing structure 40. The driving device 30 is provided adjacent to the outer surface (the rear surface) of the third support frame 23 of the drum device 11. The bearing structure 40 supports the transmission shaft 24 extending from the drum device 11 to the driving device 30 through the third support frame 23.

<Driving Device> As shown in FIG. 2 and FIG. 3, the driving device 30 includes a housing 31, a fixed frame 32, a movable frame 33, a drive source 34, a driving pulley 35, a driven pulley 36, a belt 37, and a circumference correction part 38.

(Housing, Fixed Frame, Movable Frame) The housing 31 is the exterior of the driving device 30, made of synthetic resin, and formed in a hollow box shape, for example. The housing 31 is fixed to the outer surface (the rear surface) of the third support frame 23 using, for example, a fixing member 51 such as a screw. A support cylindrical portion 31A protruding forward (toward the third support frame 23) is formed in the housing 31. The support cylindrical portion 31A is formed in a substantially cylindrical shape, and through the support cylindrical portion 31A, the transmission shaft 24 is inserted. The third support frame 23 has a free insertion hole 25 through which the support cylindrical portion 31A penetrates with play (see also FIG. 4). Also, the housing 31 includes four through-holes 52 through which the fixing member 51 penetrates with play (see also FIG. 5), and the third support frame 23 includes four fixing holes 27 with which the fixing members 51 penetrating the through-holes 52 are screwed (see also FIG. 4 and FIG. 5).

(Fixed Frame, Movable Frame) The fixed frame 32 and the movable frame 33 are each made of sheet metal, and is housed in the housing 31 in a posture (standing posture) substantially parallel to the third support frame 23. The fixed frame 32 is fixed to the inside the housing 31 using, for example, a screw or the like (not shown). The rear end portion of the transmission shaft 24 extending from the photosensitive drum 20 enters the housing 31, and is supported by the fixed frame 32. The movable frame 33 faces the lower portion of the rear surface of the fixed frame 32. The fixed frame 32 has a slide groove (not shown) extending in the upper-and-lower direction, and the movable frame 33 has a slide projection 33B slidably engaged with the slide groove. The movable frame 33 is provided (engaged) so as to be slidable in the upper-and-lower direction with respect to the fixed frame 32. The slide groove may be formed in the movable frame 33, and the slide projection 33B may be provided in the fixed frame 32 (not shown). The movable frame 33 may be slidably supported on the housing 31 instead of the fixed frame 32 (not shown).

(Drive Source) The drive source 34 is, for example, a DC motor, which is electrically connected to the control device and controlled to be driven. As shown in FIG. 3, the drive source 34 has a motor body 34A including a stator and a rotor (not shown), and a driving shaft 34B extending from the axis of the rotor. The motor body 34A is fixed to the lower portion of the rear surface of the movable frame 33. The driving shaft 34B is formed in a cylindrical shape (a round rod shape), and is rotatably supported on the motor body 34A around the axis via a bearing (not shown). The driving shaft 34B passes a hole (not shown) opened in the movable frame 33, and protrude forward from the movable frame 33. The driving shaft 34B is made of non-magnetic stainless steel with high accuracy, has very little bending, and is supported by the motor body 34A in a state where the inclination and shaft run-out is very little during rotation.

(Driving Pulley) The distal end portion of the driving shaft 34B of the drive source 34 is used as the driving pulley 35 (see FIG. 3). The driving pulley 35 (the drive shaft 34B) is rotated by the drive source 34 (the motor body 34A) fixed to the movable frame 33. Although the details will be described later, since the driving pulley 35 is in contact with the metal belt 37, it is necessary to select the material of the driving pulley 35 in consideration of galvanic corrosion. In the present embodiment, the driving pulley 35 (the drive shaft 34B) is made of austenitic stainless steel (non-magnetic stainless steel) such as SUS 303, SUS 304 or SUS 631 in consideration of inhibition of the galvanic corrosion and mass-producibility. In order to reduce wear between the driving pulley 35 and the belt 37, the surface roughness of the driving pulley 35 (the drive shaft 34B) is set to Ra 0.2 or less.

(Driven Pulley) The driven pulley 36 is made of metallic material or synthetic resin having abrasion resistance, and formed in a disk shape (or a cylinder shape). As shown in FIG. 3, the driven pulley 36 is formed to have a larger diameter than the driving pulley 35, and is arranged at a position separated from the driving pulley 35 upward. The driven pulley 36 is arranged in front of the fixed frame 32, and fixed in alignment with the axis of the transmission shaft 24 supported by the fixed frame 32. The axis (the transmission shaft 24) of the driven pulley 36 is arranged in parallel with the driving pulley 35 (the driving shaft 34B). The driven pulley 36 and the transmission shaft 24 are made of non-magnetic stainless steel with high accuracy, similar to the driving pulley 35 (the drive shaft 34B).

(Belt) The belt 37 is made of metal flat band, and formed in an annular shape. The belt 37 is wound around the driving pulley 35 and the driven pulley 36. The belt 37 is preferably made of, for example, stainless steel of martensitic or austenitic type. The thickness of the belt 37 may be 20 μm or more and 40 μm or less. The belt 37 transmits the rotation of the driving pulley 35 (the drive shaft 34B) to the driven pulley 36 (the transmission shaft 24).

(Circumference Correction Part) As shown in FIG. 3, the circumference correction part 38 includes a pair of left and right compression coil springs 38A mounted between the fixed frame 32 and the movable frame 33. Specifically, a pair of first receiving portions 32A protrude substantially horizontally on the right and left side portions of the fixed frame 32, a pair of second receiving portions 33A protrude substantially horizontally on the right and left side portions of the movable frame 33, and the compression coil spring 38A is provided between each first receiving portion 32A and each second receiving portion 33A. Each compression coil spring 38A biases the movable frame 33 in a direction (downward) away from the fixed frame 32, so that a predetermined tension is applied to the belt 37.

In the vicinity of the driven pulley 36, in order to detect the rotational speed of the photosensitive drum 20 (the transmission shaft 24), a speed detecting part including an encoder disk, an optical sensor, or the like is provided (not shown).

<Bearing Structure> The bearing structure 40 is a structure which supports the transmission shaft 24 rotating around the axis and receiving a load. As shown in FIG. 2 and FIG. 3, the bearing structure 40 includes a first bearing part 41, a second bearing part 42, and a third bearing part 43. Each of the three bearing parts 41 to 43 is a so-called ball bearing in which a plurality of spheres (rolling elements) is arranged between the outer ring and the inner ring. The first bearing part 41, the second bearing part 42, and the third bearing part 43 are arranged in alignment with each other and rotatably support the transmission shaft 24.

The first bearing part 41 is provided on a fixed frame 32 arranged on the rear side of the driven pulley 36. Specifically, the outer ring of the first bearing part 41 is fixed to the upper portion of the fixed frame 32, and the rear end portion of the transmission shaft 24 is fitted (penetrated) in the inner ring of the first bearing part 41. The second bearing part 42 is provided in the housing 31 at a position where the driven pulley 36 is disposed between the second bearing part 42 and the first bearing part 41. Specifically, the second bearing part 42 is disposed in front of the driven pulley 36. The outer ring of the second bearing part 42 is fitted (fixed) in the support cylindrical portion 31A of the housing 31, and the transmission shaft 24 penetrates the inner ring of the second bearing part 42. The third bearing part 43 is provided in the drum device 11. Specifically, the outer ring of the third bearing part 43 is fixed to the second support frame 22, and the front end portion of the transmission shaft 24 is fitted (penetrated) in the inner ring of the third bearing part 43.

By the way, the design in which the three bearing parts 41 to 43 are arranged on the same line has no adjustable allowance for the position (in the upper- and lower direction, in the left-and-right direction) of the transmission shaft 24 penetrating the third support frame 23, resulting in a design in which freedom is restricted. If the positions of the three bearing parts 41 to 43 are slightly shifted, the transmission shaft 24 may be distorted or any of the three bearing parts 41 to 43 may be damaged. If the three bearing parts 41 to 43 are aligned perfectly on the same line, the above problem will not occur, but it is difficult to align the three bearing parts 41 to 43 perfectly on the same line in consideration of the accumulated tolerances of the parts and the deviation during assembly. Therefore, the belt driving mechanism 8 according to the present embodiment is provided with the adjustment member 44 which is disposed between the third support frame 23 and the housing 31 and adjusts the position of the housing 31 relative to the third support frame 23.

<Adjustment Member> The adjustment member 44 is made of metallic material such as stainless steel, and formed in a substantially parallelogram (a substantially rhomboid) plate shape, for example (see FIG. 4). The adjustment member 44 is fixed to the outer surface (the rear surface) of the third support frame 23 by, for example, a fastening member 50 such as a screw (see FIG. 2). As shown in FIG. 4, the adjustment member 44 has a support hole 45 and a pair of adjustment holes 46. The support hole 45 is a round hole opened substantially in the center of the adjustment member 44. The inner diameter of the support hole 45 is substantially the same as the outer diameter of the support cylindrical portion 31A of the housing 31 (see FIG. 2). The support cylindrical portion 31A of the housing 31 is fitted into the support hole 45, and fixedly supported. The pair of adjustment holes 46 are round holes opened in diagonal positions of the adjustment member 44 on both sides of the support hole 45. The inner diameter of each adjustment hole 46 is larger than the outer diameter of the fastening member 50 (the male screw portion) (see FIG. 2). The fastening member 50 penetrates each adjustment hole 46 with play.

A pair of fastening holes 26 are formed in the third support frame 23 on both sides of the free insertion holes 25 (see FIG. 4). A female screw (not shown) is formed on the inner circumferential surface of each fastening hole 26, and the fastening member 50 penetrating the adjustment hole 46 of the adjustment member 44 is fastened (screwed) to each fastening hole 26.

Figure 6:
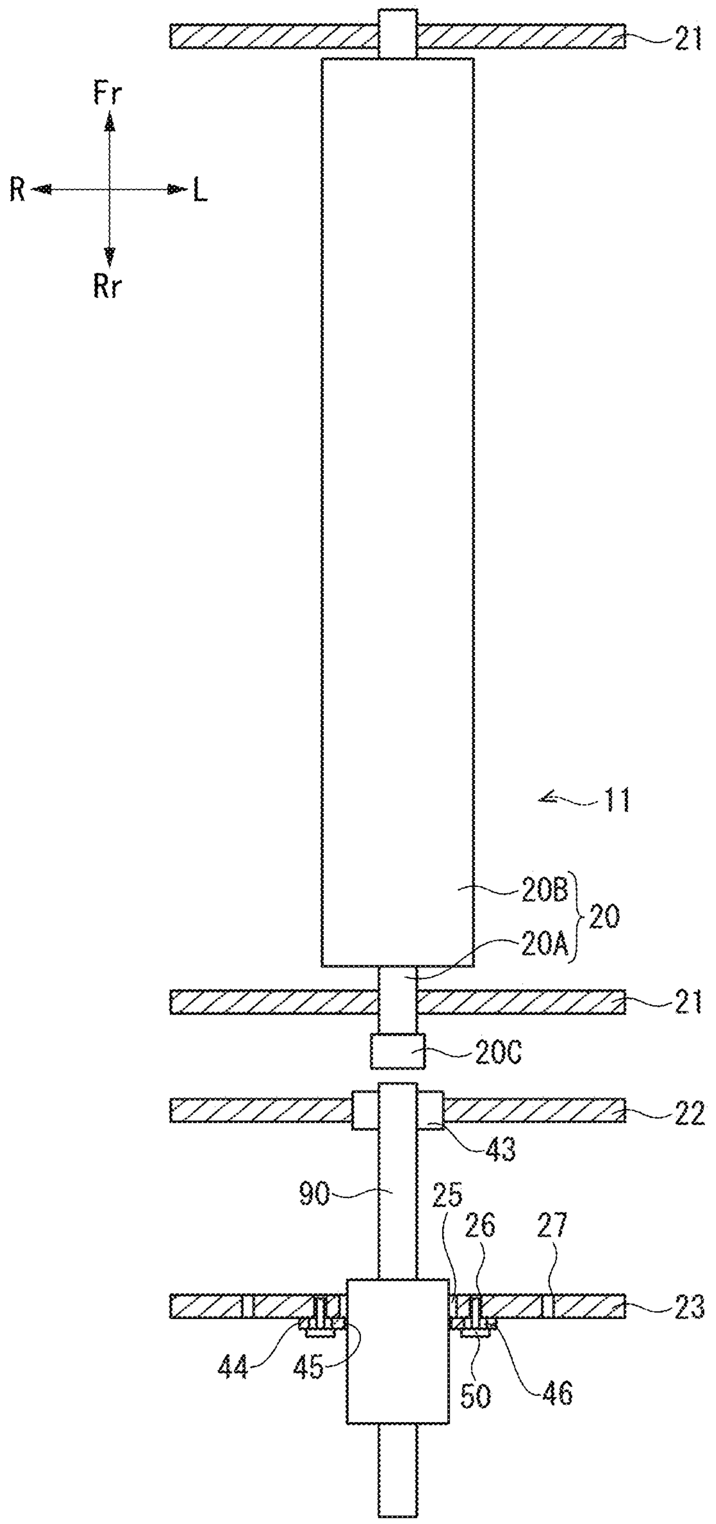
FIG. 6 is a plan view explaining an assembling procedure of the belt driving mechanism according to the embodiment of the present disclosure.

[Belt Driving Mechanism Assembly Procedure]Next, with reference to FIG. 2 to FIG. 6, an assembly procedure of the belt driving mechanism 8, specifically, a procedure for attaching the driving device 30 (the housing 31) and the adjustment member 44 to the third support frame 23 will be described. FIG. 6 is a plan view explaining the assembly procedure of the belt driving mechanism 8. It assumed that is the photosensitive drum 20 is supported by the pair of first support frames 21, and the third bearing part 43 is fixed to the second support frame 22. It is assumed that the transmission shaft 24 is inserted into the housing 31 from the support cylindrical portion 31A and is supported by (the inner rings of) the first to second bearing parts 41 to 42, and the driving device 30 is completed.

The operator screws the fastening member 50 penetrating each adjustment hole 46 of the adjustment member 44 into the fastening hole 26 of the third support frame 23 (see FIG. 4). At this time, the operator loosens the fastening members 50 without completely fastening them. Since each adjustment hole 46 has a larger diameter than the fastening member 50 (the male screw portion), the adjustment member 44 is movable within a gap between the fastening member 50 and the adjustment hole 46.

Next, as shown in FIG. 6, the operator inserts a jig 90 into the support hole 45 of the adjustment member 44 and the free insertion hole 25 of the third support frame 23. The jig 90 imitates the transmission shaft 24 and the support cylindrical portion 31A of the housing 31, for example, and is formed in a stepped round rod shape. In the process of inserting the portion of the jig 90 imitating the support cylindrical portion 31A into the support hole 45, the adjustment member 44 is moved parallel to the outer surface of the third support frame 23 within the range of play of the adjustment hole 46 with respect to the fastening member 50, so that the position of the support hole 45 is adjusted. In this state, the portion of the jig 90 imitating the support cylindrical portion 31A is fitted into the support hole 45 with almost no gap, and the tip portion of the jig 90 imitating the transmission shaft 24 is fitted into the inner ring of the third bearing part 43. After the position of the support hole 45 is adjusted by the jig 90, the operator securely fastens each fastening member 50 and fixes the adjustment member 44 to the outer surface of the third support frame 23 (see FIG. 4). The operator then pulls (removes) the jig 90.

Next, the operator inserts the transmission shaft 24 supported by the first to second bearing parts 41 to 42 into the support hole 45 of the adjustment member 44, connects the tip portion of the transmission shaft 24 to the coupling 29C through the inner ring of the third bearing part 43, and fits the support cylindrical portion 31A of the housing 31 into the support hole 45 of the adjustment member 44 (see FIG. 2 and FIG. 3). Since the adjustment member 44 is positioned to the third support frame 23 in advance and then fixed to the third support frame 23, the first to third bearing parts 41 to 43 are arranged on the same line only by fitting the support cylindrical portion 31A of the housing 31 into the support hole 45 of the adjustment member 44 (see FIG. 2 and FIG. 3).

Finally, the operator fastens the fixing member 51 penetrating each through-hole 52 of the housing 31 to the fixing hole 27 of the third support frame 23 (see FIG. 2, FIG. 3 and FIG. 5). As described above, the housing 31 is fixed to the third support frame 23 with the adjustment member 44 in between, in a state where the support cylindrical portion 31A fitted to the support hole 45 of the adjustment member 44 is inserted into the free insertion hole 25 of the third support frame 23 (see FIG. 2 and FIG. 3). That is, the belt driving mechanism 8 is completed.

[Action of Belt Driving Mechanism] Next, the operation of the belt driving mechanism 8 will be briefly described. When the image forming process described above is started, the control device drives the drive source 34. The drive source 34 rotates the driving shaft 34B (the driving pulley 35) around the axis, and the rotational force of the driving pulley 35 is transmitted to the driven pulley 36 through the belt 37. The transmission shaft 24 rotates around the same axis as the driven pulley 36, and rotates the photosensitive drum 20 around the axis. The speed detection part detects the rotation speed of the photosensitive drum 20, and the control device performs feedback control of the drive source 34 based on the detection result of the rotation speed to rotate the photosensitive drum 20 at a predetermined speed.

In the belt driving mechanism 8 according to the embodiment described above, the first bearing part 41 and the second bearing part 42 support the transmission shaft 24 on both sides of the driven pulley 36 in the axial direction of the driven pulley 36 (see FIG. 3). According to this configuration, since the driven pulley 36 is fixed to the transmission shaft 24 between the two bearing parts 41, 42, the tension applied to the belt 37 can be received by the two bearing parts 41, 42. Thus, even when the belt 37 is applied with tension, the position, angle, and posture of the driven pulley 36 are suppressed from changing, and the driven pulley 36 is suppressed from slightly moving in the direction closer to the driving pulley 35, so that the alignment of both pulleys s 35, 36 can be properly maintained.

According to the belt driving mechanism 8 according to the present embodiment, since the first to third bearing parts 41 to 43 support the transmission shaft 24, the transmission shaft 24 can be positioned with high accuracy. In addition, the adjustment member 44 is fixed to the third support frame 23 in a state where the position of the housing 31 is adjusted. According to this configuration, the first to third bearing parts 41 to 43 can be arranged on the same line, and the housing 31 can be attached to the third support frame 23 with high accuracy. As a result, it is possible to suppress defects such as distortion of the transmission shaft 24 and breakage of any of the first to third bearing parts 41 to 43.

According to the belt driving mechanism 8 according to the present embodiment, the position of the support cylindrical portion 31A (the housing 31) supported by the support hole 45 can be adjusted by moving the adjustment member 44 within the range of play of the adjustment hole 46 with respect to the fastening member 50 and then fastening the fastening member 50 to the fastening hole 26. Thus, the first to third bearing parts 41 to 43 can be easily arranged on the same line with a simple configuration.

In the belt driving mechanism 8 according to the present embodiment, the bearing structure 40 has three bearing parts 41 to 43, but the present disclosure is not limited thereto. For example, the third bearing part 43 may be omitted, and the bearing structure 40 may include the first bearing part 41 and the second bearing part 42 (not shown).

In the belt driving mechanism 8 according to the present embodiment, the driving pulley 35 is a part of the driving shaft 34B, but the present disclosure is not limited thereto. For example, the driving pulley 35 may be a separate member from the driving shaft 34B, and may be formed in a disk shape (or a cylinder shape) and fixed to the distal end of the driving shaft 34B in the same manner as the driven pulley 36 (not shown).

Figure 7:
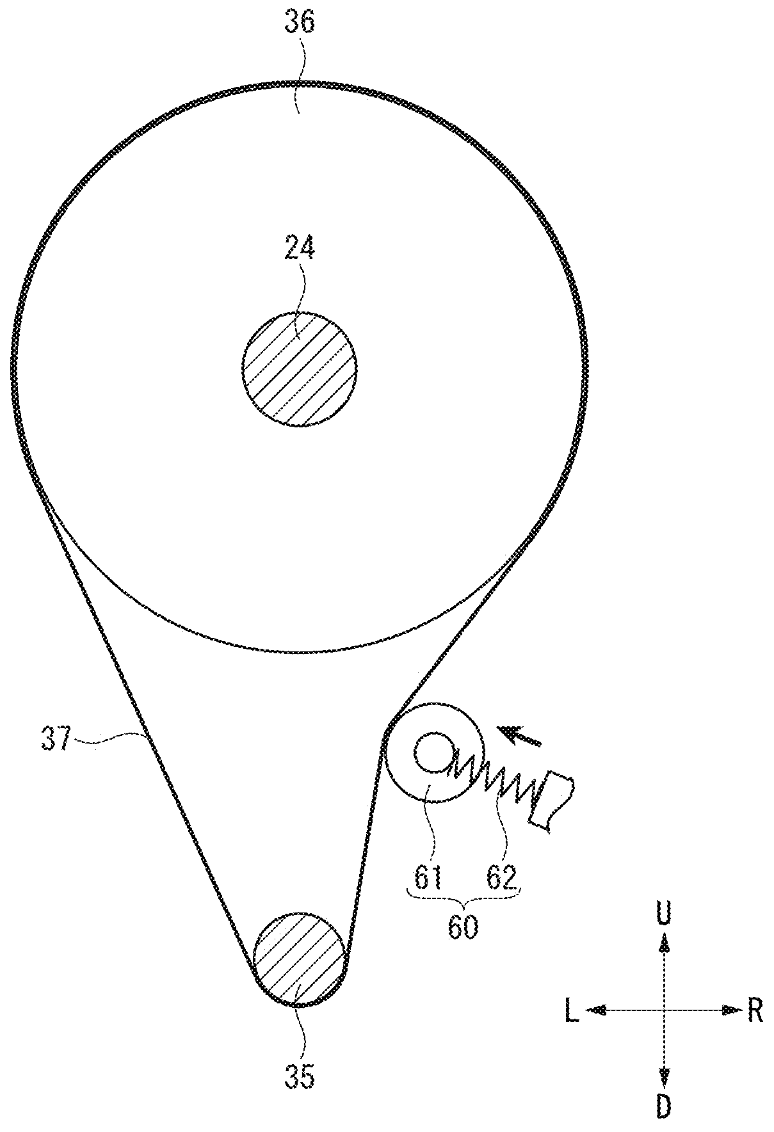
FIG. 7 is a front view showing a circumference correction part and the others of the belt driving mechanism according to a modified example of the embodiment of the present disclosure.

In the belt driving mechanism 8 according to the present embodiment, the circumference correction part 38 is the pair of compression coil springs 38A, but the present disclosure is not limited thereto. As shown in FIG. 7, the other circumference correction part 60 may include a tension roller 61 which is in contact with the outside of the belt 37 and a coil spring 62 which presses the tension roller 61 against the belt 37. In this case, the movable frame 33 may be fixed to the inside of the housing 31, or the movable frame 33 may be omitted and the drive source 34 may be supported by the housing 31 (neither of which is shown).

In the belt driving mechanism 8 according to the present embodiment, the fastening member 50 which fixes the adjustment member 44 to the third support frame 23 is a screw, but the present disclosure is not limited thereto. For example, the fastening member 50 may be a rivet pressed into the fastening hole 26 (not shown). The fixing member 51 which fixes the housing 31 to the third support frame 23 may also be a rivet pressed into the fixing hole 27 (not shown).

In the belt driving mechanism 8 according to the present embodiment, the adjustment member 44 is fixed to the third support frame 23 by two fastening members 50, but the present disclosure is not limited thereto. For example, the adjustment member 44 may be provided with a projection, the third support frame 23 may be provided with a recess into which the projection of the adjustment member 44 is fitted, and the adjustment member 44 may be adjusted in position by turning (swinging) the adjustment member 44 around the projection fitted in the recess (not shown). In this case, the fastening member 50 (the adjustment hole 46 and the fastening hole 26) may be one (not shown). With the same configuration, the housing 31 may be fixed to the third support frame 23 by one fixing member 51 (not shown).

Further, although the belt driving mechanism 8 according to the present embodiment is disposed on the rear side of the drum device 11 (the photosensitive drum 20), the belt driving mechanism 8 may be disposed on the front of the drum device 11 (not shown).

In the belt driving mechanism 8 according to the present embodiment, the photosensitive drum 20 is an example of the rotating body, and the drum device 11 is an example of the rotating device, but the present disclosure is not limited thereto. The rotating body may be a conveying roller or the like rotating around an axis, and the rotating device may be a device having a conveying roller or the like (neither is shown).

The image forming apparatus 1 according to the present embodiment is a monochrome printer, but may be a color printer, a copying machine, a facsimile machine, or the like. The image forming method of the image forming apparatus 1 is an electrophotographic system, but it is not limited thereto and may be an inkjet system.

The description of the above embodiment shows one aspect of the belt driving mechanism and the image forming apparatus according to the present disclosure, and the technical scope of the present disclosure is not limited to the above embodiment. The present disclosure may be variously modified, substituted, or modified to the extent that it does not deviate from the purport of technical thought, and the claims include all embodiments that may be included within the scope of technical thought.

The invention claimed is:

1. A belt driving mechanism which rotates a rotating body provided in a rotating device, around a transmission shaft, the belt driving mechanism comprising:

a driving device provided adjacent to an outer surface of a support frame of the rotating device; and a bearing structure which supports the transmission shaft extending from the rotating device to the driving device through the support frame, wherein the driving device includes:

a housing fixed on the outer surface of the support frame;

a fixed frame fixed in an inside of the housing;

a driving pulley rotating by a drive source;

a driven pulley fixed to the transmission shaft in alignment with the transmission shaft;

a belt wound around the driving pulley and the driven pulley; and a circumference correction part which applies tension to the belt, and the bearing structure includes:

a first bearing part provided in the fixed frame, and a second bearing part provided in the housing on an opposite side to the first bearing part with respect to the driven pulley, and the belt driving mechanism further comprising:

an adjustment member which is disposed between the support frame and the housing, and adjusts a position of the housing with respect to the support frame, wherein the bearing structure further includes a third bearing part provided in the rotating device, wherein the adjustment member is fixed to the support frame in a state where it adjusts the position of the housing, wherein the housing has a support cylindrical portion protruding toward the support frame, the transmission shaft passing through the support cylindrical portion, the support frame has a free insertion hole through which the support cylindrical portion penetrates with play and a fastening hole to which a fastening member is fastened, the adjustment member has a support hole into which the support cylindrical portion of the housing is fitted and supports it immovably, and an adjustment hole through which the fastening member penetrates with play, the housing is fixed to the support frame with the adjustment member in between, in a state where the support cylindrical part fitted to the support hole of the adjustment member is inserted into the free insertion hole of the support frame, the adjusting member is capable of being moved parallel to the outer surface of the support frame in a range of play of the adjustment hole with respect to the fastening member so that a position of the supporting hole is capable of being adjusted, and the fastening member is capable of being fastened to the fastening hole to be fixed to the support frame.

2. The belt driving mechanism according to claim 1, wherein, the driving pulley is a driving shaft of the drive source.

3. The belt driving mechanism according to claim 1, wherein the second bearing part is disposed closer to the rotating body than the first bearing part.

4. An image forming apparatus comprising:

the belt driving mechanism according to claim 1; and a drum device which is the rotating device including a photosensitive drum as the rotating body.

* * * * *